United States Patent [19]
Ozkan et al.

[11] Patent Number: 5,933,450
[45] Date of Patent: Aug. 3, 1999

[54] COMPLEXITY DETERMINING APPARATUS

[75] Inventors: Mehmet Kemal Ozkan, Indianapolis; Billy Wesley Beyers, Greenfield, both of Ind.

[73] Assignee: Thomson Consumer Electronics, Inc., Indianapolis, Ind.

[21] Appl. No.: 08/722,236

[22] PCT Filed: Apr. 20, 1994

[86] PCT No.: PCT/US94/04334

§ 371 Date: Oct. 15, 1996

§ 102(e) Date: Oct. 15, 1996

[87] PCT Pub. No.: WO95/29550

PCT Pub. Date: Nov. 2, 1995

[51] Int. Cl.$^6$ ............................................. H04B 3/46
[52] U.S. Cl. ...................... 375/224; 348/180; 348/404
[58] Field of Search .................................. 348/423, 403, 348/424, 413, 404, 489, 180; 369/124; 382/232; 358/133; 375/245, 260, 240, 377, 224

[56] References Cited

U.S. PATENT DOCUMENTS

| | | | |
|---|---|---|---|
| 4,394,774 | 7/1983 | Widergren et al. | 382/56 |
| 4,862,264 | 8/1989 | Wells et al. | 358/138 |
| 4,890,162 | 12/1989 | McNeely et al. | 348/424 |
| 5,113,242 | 5/1992 | Tsinberg et al. | 348/489 |
| 5,115,309 | 5/1992 | Hang | 358/133 |
| 5,121,216 | 6/1992 | Chen et al. | 358/261.3 |
| 5,138,440 | 8/1992 | Radice | 358/13 |
| 5,144,424 | 9/1992 | Savatier | 358/133 |
| 5,231,494 | 7/1993 | Wachob | 358/146 |
| 5,241,401 | 8/1993 | Fujiwara et al. | 358/404 |
| 5,263,100 | 11/1993 | Kim et al. | 382/56 |
| 5,291,282 | 3/1994 | Nakagawa et al. | 348/384 |
| 5,301,242 | 4/1994 | Gonzales et al. | 382/56 |
| 5,490,130 | 2/1996 | Akagiri | 369/124 |
| 5,592,226 | 1/1997 | Lee et al. | 348/413 |
| 5,617,145 | 4/1997 | Huang et al. | 348/423 |

FOREIGN PATENT DOCUMENTS

| | | | |
|---|---|---|---|
| 502 545 A2 | 9/1992 | European Pat. Off. | H04N 7/133 |
| 514 663 A2 | 11/1992 | European Pat. Off. | H04N 7/133 |
| 574 724 A2 | 12/1993 | European Pat. Off. | H04N 7/13 |
| 2 673 014 | 8/1992 | France | G06F 15/68 |
| WO 87/04033 | 7/1987 | WIPO | H04N 7/12 |

OTHER PUBLICATIONS

Haskell, "Buffer and Channel Sharing by Several Interframe Picturephone Coders", The Bell System Technical Journal, vol. 51, Jan. 1972, pp. 261–289.

Kishino et al., "Variable Bit–Rate coding of Video Signals for ATM Networks", IEEE Journal on Selected Areas in Communications, vol. 7, No. 5, Jun. 1989, pp. 801–806.

Zdepski et al. "Statistically Based Buffer Control Policies for Constant Rate Transmission of Compressed Digital Video", IEEE Transactions on Communications, vol. 39, No. 6, Jun. 1991, pp. 947–957.

*Primary Examiner*—Amanda Le
*Attorney, Agent, or Firm*—Joseph S. Tripoli; Eric P. Herrmann; Ronald H. Kurdyla

[57] ABSTRACT

A complexity determining apparatus is disclosed which comprises a source of a data signal and a subsampler system, coupled to the data signal source, for producing a subsampled signal representing the data signal. A variable bit rate (VBR) encoder is responsive to the subsampled signal and produces an encoded signal representing the subsampled signal. A counter accumulates the number of bits in the encoded signal and produces a complexity representative signal corresponding to the accumulated number of bits.

15 Claims, 2 Drawing Sheets

COMPLEXITY DETERMINING APPARATUS

The present application relates to apparatus for determining the complexity of a data signal using forward analysis.

BACKGROUND OF THE INVENTION

It is sometimes useful to have an indication of the complexity of a data signal. For example, it has been proposed to multiplex a plurality of coded video signals, each encoded using a constant bit rate (CBR) encoder. The bit rate allocated to each of the CBR encoders is dynamically varied, based on both the complexity of the video signal being encoded, and the combined complexities of all of the video signals being multiplexed. In such a system, video signals having relatively high complexity are allocated a higher bit rate than those having relatively low complexity.

In another example, the CBR encoders, themselves, maintain their allocated constant bit rate by varying the quantizing step size (or the number of quantizing steps) used to encode the video signal. Using a smaller quantizing step size (or more quantizing steps) requires more bits to encode them; and conversely using a larger quantizing step size requires fewer bits. The quantizing step size is generally varied in response to the current instantaneous bit rate to maintain the overall predetermined constant bit rate.

In both of the above examples, it is desirable to have a complexity representative signal for each video signal being multiplexed. In the multiplexing example, the bit rates allocated to the CBR encoders encoding the video signals are adjusted, based on these complexity signals. In the CBR encoder example, the quantizing step size may be set based on the complexity of the signal being encoded, in addition to the current instantaneous bit rate.

One known measure of the complexity of a video signal is the number of bits necessary to encode that video signal using a variable bit rate (VBR) encoder: more bits indicate higher complexity, and conversely, fewer bits indicate lower complexity. Such a complexity measure can be generated in advance, or in parallel with other processing, a process termed forward analysis. The complexity measure, thus derived, may by used to control processing of that video signal by subsequent processing circuitry, such as a CBR encoder, or multiplexing system. A VBR encoder is a complex electronic system, however, and including a VBR encoder for each signal to be multiplexed in a multiplexer system, to determine the complexity of that signal, is expensive and results in lowered reliability due to the added complex circuitry.

Another proposed method for measuring the complexity of a video signal being encoded by a CBR encoder uses parameters generated during the CBR encoding process. Specifically, the product of the average quantizing step size for a predetermined time period of the video signal times the number of bits generated from encoding the video signal during that period has been found to vary with the complexity of the video signal being encoded, while being independent of the predetermined constant bit rate being produced by the CBR encoder. This measure, however, is produced during the encoding process, and is not available until after the picture or frame has been encoded, a process termed backward analysis. While this measure may be used as an estimate of the complexity of succeeding frames, it cannot be used by the CBR encoder itself to determine the necessary quantizing step size. It can also lead to inaccurate operation of the multiplexing system if a sudden change in complexity occurs, in particular, from a relatively simple image to a relatively complex one.

It is desirable to produce a measure of the complexity of a data signal that is available to the processing system simultaneously with the processing of the data signal itself, but does not require a very complex electronic system to produce the complexity measure.

BRIEF SUMMARY OF THE INVENTION

The inventors have realized that the complexity of a video signal will also be accurately reflected in a video signal corresponding to the original video signal, but having a lower spatial and/or temporal resolution. If a video signal is properly subsampled to produce a reduced resolution video signal, and then that reduced resolution video signal is VBR encoded, the number of bits resulting from that encoding process will accurately reflect the complexity of the original video signal.

In accordance with principles of the present invention, complexity determining apparatus comprises a source of a data signal and a subsampler system, coupled to the data signal source, for producing a subsampled signal representing the data signal. A variable bit rate (VBR) encoder is responsive to the subsampled signal and produces an encoded signal representing the subsampled signal. A counter accumulates the number of bits in the encoded signal and produces a complexity representative signal corresponding to the accumulated number of bits.

A VBR encoder encoding a video signal of reduced resolution may be greatly reduced in size and complexity compared to a VBR encoder for a full resolution video signal. In addition, a complexity measure by such apparatus may be generated by forward analysis, and be available to control subsequent processing of the frame of video which the complexity measure represents.

DETAILED DESCRIPTION OF A PREFERRED EMBODIMENT

Figure 1:
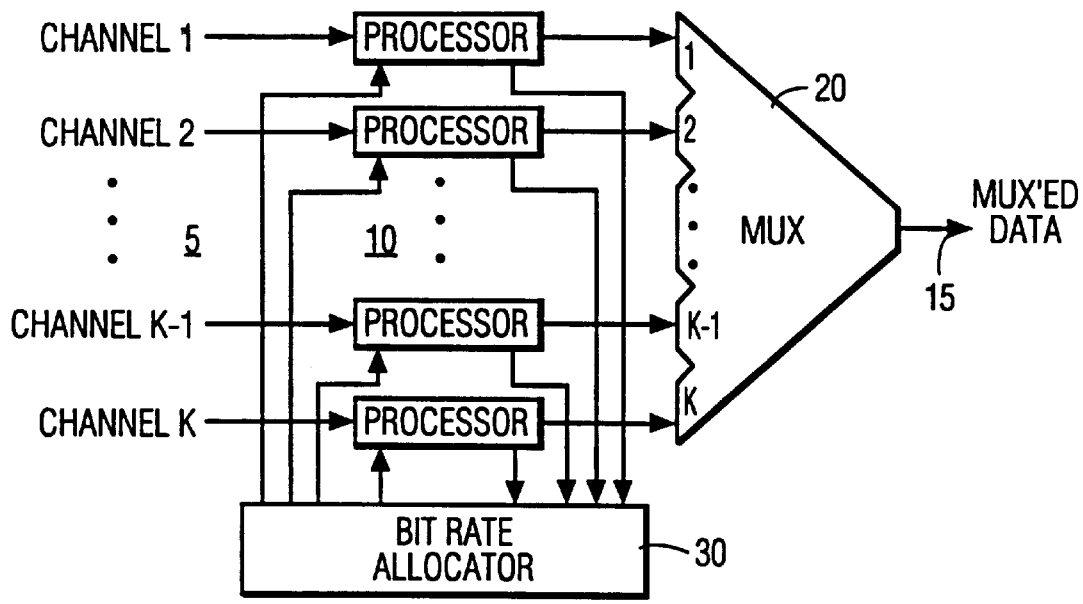
FIG. 1 is a block diagram of a multiplexer system including complexity determining apparatus according to the present invention.

FIG. 1 is a block diagram of a multiplexer system incorporating the present invention. In FIG. 1, all signal paths are illustrated as single signal lines. However, one skilled in the art will understand that the illustrated signal paths could carry multibit digital signals, either in parallel, in which case the signal paths would be composed of multiple signal lines, or serially, in which case the signal paths could be a single data line and/or include a data and clock signal line. Other control and clock signal paths, not germane to the understanding of the present invention have been omitted from the figure to simplify it.

In FIG. 1 a plurality of input terminals 5 are coupled to sources (not shown) of video signals (CHANNEL 1–CHANNEL K) which are to be transmitted together over a data link. The plurality of input terminals 5 are coupled to respective data input terminals of a corresponding plurality of channel processors 10. Respective data output terminals of the plurality of channel processors 10 are coupled to corresponding data input terminals 1–K of a multiplexer (MUX) 20. A data output terminal of multiplexer 20 is coupled to an output terminal 15 of the multiplexer system. Output terminal 15 is coupled to utilization circuitry (not shown) for transmitting the multiplexed data stream (MUX'ED DATA) over the transmission link.

Each of the plurality of channel processors 10 further includes a complexity output terminal and a control input terminal. The respective complexity output terminals of each of the plurality of channel processors are coupled to corresponding complexity input terminals of a bit rate allocator 30, and respective quota output terminals of the bit rate allocator 30 are coupled to the corresponding control input terminals of the plurality of channel processors 10.

In operation, each channel processor receives a signal at its control input terminal representing the bit rate allocated to it for the next quota period. The channel processor then encodes the signal at its data input terminal for the next quota period into a digitally encoded signal at the allocated bit rate. The encoded data signal is supplied to the corresponding input terminal of multiplexer 20. Multiplexer 20 operates in a known manner to combine the signals from all the channel processors into a multiplexed data stream. The multiplexed data stream is then supplied to the circuitry comprising the data link for transmission, also in a known manner.

During the encoding process, the channel processor 10 generates a signal at its complexity output terminal representing the coding complexity of the signal being encoded. The bit rate allocator 30 receives the signals from the complexity output terminals of the channel processors 10, and, based on all of the complexity signals, dynamically adjusts the bit rate quotas for the next quota period among the plurality of channel processors 10. In a preferred embodiment, more complex signals are dynamically allocated a relatively higher bit rate than less complex signals. Apparatus for determining the complexity of the video signal and different methods for allocating bit rates based on the complexities are described below.

Figure 2:
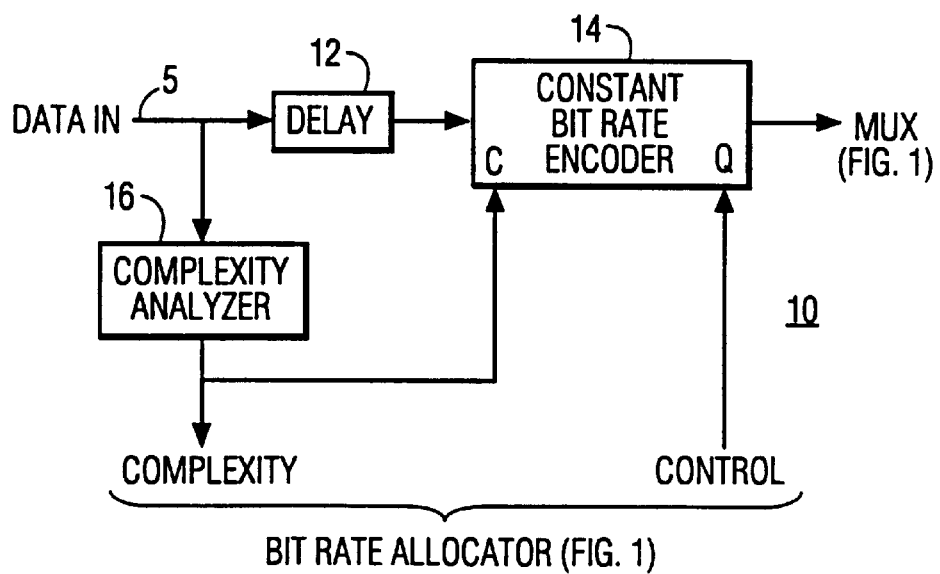
FIG. 2 is a block diagram of a channel processor which may be used in the multiplexer system illustrated in FIG. 1.

FIG. 2 is a block diagram of a channel processor which may be used in the multiplexer system illustrated in FIG. 1. In FIG. 2, elements similar to those in FIG. 1 are designated by the same reference number, and are not described in detail below. In FIG. 2, a data input terminal 5 is coupled a video signal source (not shown). Data input terminal 5 is coupled to an input terminal of a delay element 12, and an input terminal of a complexity analyzer 16. An output terminal of delay element 12 is coupled to a data input terminal of a constant bit rate (CBR) encoder 14. A data output terminal of the CBR encoder 14 is coupled to an input terminal of multiplexer (MUX) 20 (of FIG. 1). A control input terminal (CONTROL) of the channel processor 10 is coupled to a quota input terminal Q of the CBR encoder 10. An output terminal of the complexity analyzer 16 is coupled to the complexity output terminal (COMPLEXITY) of the channel processor 10, and to a complexity input terminal C of the CBR encoder 14.

In operation, the complexity analyzer 16 analyzes the complexity the video signal at the data input terminal 5 in a manner to be described below. A signal is produced at the output terminal of the complexity analyzer 16 representative of the complexity of the input signal. The complexity representative signal is supplied to the CBR encoder 14 and the bit rate allocator 30 (of FIG. 1). In response to this complexity signal (and those of the other channel processors 10), bit rate allocator 30 provides a signal to the control input terminal (CONTROL) of this channel processor 10 (and the other channel processors 10) representing the bit rate allocated to this channel processor 10. The CBR encoder 14 provides a data path between its data input and data output terminals for producing an output signal encoded at a constant bit rate. The constant bit rate is maintained in response to the signal at the quota input terminal Q from the control input terminal (CONTROL) of the channel processor 10 and the complexity signal at the complexity input terminal C from the complexity analyzer 16. The quantizing step size for the video signal is controlled based on the allocated bit rate and the complexity of the video signal currently being encoded in a manner to be described below.

Delay element 12 delays the video signal for sufficient time for the complexity analyzer 16 to generate the complexity representative signal, and for the bit rate allocator 30 to generate the bit rate allocation signal for the CBR encoder 14. Thus, a bit rate allocation signal arrives at the CBR encoder 14 simultaneously with the video signal in response to which that allocation signal was generated. This provides the desired forward analysis. Delay element 12 may be constructed in known manner of memory, or other delay elements and/or may include other processing circuitry, or transmission paths which do not require control in response to the complexity of the video signal.

Figure 3:
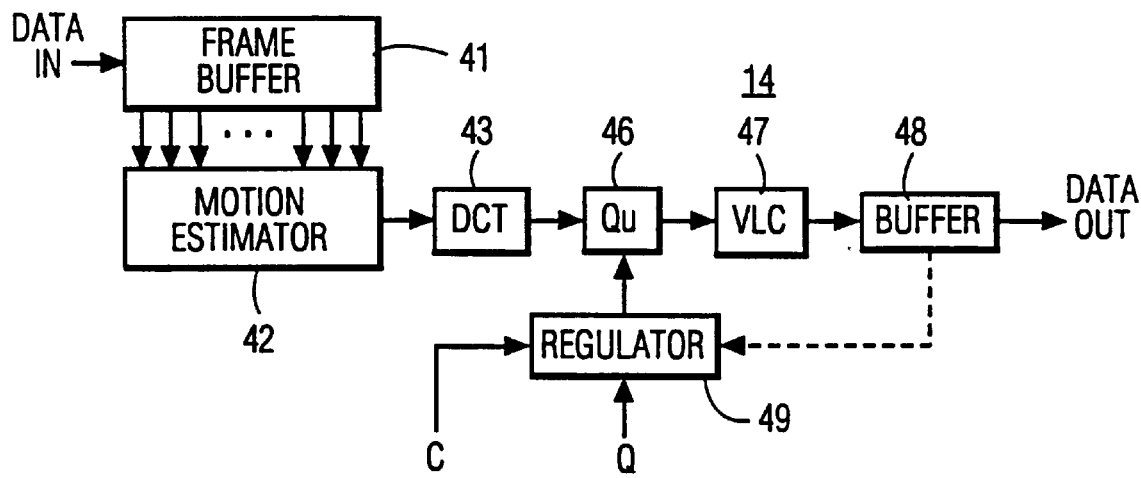
FIG. 3 is a block diagram of a portion of an MPEG encoder which may be used in the channel processor illustrated in FIG. 2.

In a preferred embodiment, each CBR encoder 14 is an encoder which compresses and encodes a video signal in accordance with a standard promulgated by the Moving Picture Expert Group (MPEG), termed an MPEG encoder. FIG. 3 is a block diagram illustrating a portion of an MPEG encoder 14. The known components of the MPEG encoder 14 will not be described in detail below. MPEG encoders include other elements, not germane to an understanding of the present invention, which have been omitted from the figure to simplify it.

In FIG. 3, a data input terminal (DATA IN) of MPEG encoder 14 is coupled to the output terminal of delay element 12 (of FIG. 2), which provides the video signal to be compressed and encoded. The data input terminal (DATA IN) is coupled to an input terminal of a frame buffer 41. Frame buffer 41 includes a plurality of frame period delay lines and a plurality of output terminals producing respective signals representing portions of different, but temporally adjacent, frames or pictures. The plurality of output terminals of the frame buffer 41 are coupled to corresponding input terminals of a motion estimator 42. An output terminal of the motion estimator is coupled to a discrete cosine transform (DCT) circuit 43. An output terminal of DCT circuit 43 is coupled to a data input terminal of a variable quantizer (Qu) circuit 46. An output terminal of variable quantizer circuit 46 is coupled to an input terminal of a variable length coder (VLC) 47. An output terminal of VLC 47 is coupled to an input terminal of an output buffer 48. A data output terminal of output buffer 48 is coupled to a data output terminal (DATA OUT) of MPEG encoder 14. The data output terminal (DATA OUT) of MPEG encoder 14 is coupled to a corresponding input terminal of multiplexer 20 (of FIG. 1).

A quota input terminal Q of MPEG encoder 14 is coupled to a corresponding quota output terminal of bit rate allocator 30 (of FIG. 1). The quota input terminal Q of the MPEG encoder 14 is coupled to a first control input terminal of regulator 49. A complexity input terminal C of MPEG encoder 14 is coupled to the complexity analyzer 16 (of FIG. 2). The complexity input terminal C is coupled to a second control input terminal of bit rate regulator 49. A control output terminal of bit rate regulator 49 is coupled to a control input terminal of variable quantizer 46.

In operation, MPEG encoder 14 compresses and encodes the video signal at its data input terminal at a constant bit rate determined by the signals at the quota input terminal Q and the complexity input terminal C. In a preferred embodiment, the MPEG encoder 14 encodes a video signal comprising a sequence of groups of pictures (GOP), each group consisting of twelve sequential frames or pictures. The duration of the GOP is the quota period for the MPEG encoder 14. For each GOP, the MPEG encoder 14 receives a new bit rate quota from the bit rate allocator 30 (of FIG. 1), and a signal representing the complexity of that GOP from the complexity input terminal.

The frame buffer 41 receives and stores data representing the portion of the twelve frames in the GOP currently being encoded necessary to perform motion estimation in a manner described below. This data is supplied to motion estimator 42. In the preferred embodiment, the first one of the twelve frames or pictures is used as a reference frame (I frame), and is passed through the motion estimator to DCT circuit 43. For the remainder of the frames, a motion vector is generated in motion estimator 42 for each one of a plurality of 16 pixel by 16 line blocks in the picture or frame, termed macroblocks in the MPEG standard document, either from preceding frames alone (P frames), or interpolated from both preceding and succeeding frames (B frames). As described above, frame buffer 41 holds the data necessary for the motion estimator to perform the estimation from preceding frames or the interpolation from preceding and succeeding frames. The generated motion vectors for a particular frame are then compared to the actual data in the frame being estimated and a motion difference signal is generated, and supplied to DCT circuit 43.

In the DCT circuit 43, the 16 pixel by 16 line macroblocks of spatial data from the I frame and motion difference signals from the P frames and B frames are divided into six 8 pixel by 8 line blocks (four luminance blocks, and two chrominance blocks) termed microblocks in the remainder of this application, in accordance with the MPEG standard document. A discrete cosine transform is performed on each microblock. The resulting 8 by 8 blocks of DCT coefficients are then supplied to variable quantizer 46. The 8 by 8 blocks of coefficients are quantized, scanned in a zig-zag order and supplied to VLC 47. The quantized DCT coefficients, and other side information (related to parameters of the encoded GOP), representing the GOP are encoded using run-length coding in the VLC 47, and supplied to output buffer 48.

It is known that the most direct way to control the output bit rate of VLC 47, and thus maintain the allocated constant bit rate for the MPEG encoder 14, is to control the number of quantizing levels (or, put another way, the quantizing step size) to be used for quantizing each block of DCT coefficients in the variable quantizer 46. The control signal supplied to the variable quantizer 46 from the bit rate regulator 49 performs this controlling function. For each GOP period, the bit rate regulator 49 receives the bit rate allocation quota and complexity representative signal for that GOP. Because the complexity of the GOP is known in advance, the quantizing step size can be precisely specified for each microblock in each frame of the GOP. The bit rate regulator 49 supplies a control signal to the variable quantizer 46 which sets the appropriate number of levels into which each microblock in the GOP is being quantized in order to maintain the allocated bit rate for that GOP period. It is also possible for the bit rate regulator 49 to use as a control input signal the number of bits used thus far in encoding a GOP, from output buffer 48, as shown in phantom in FIG. 3.

Figure 4:
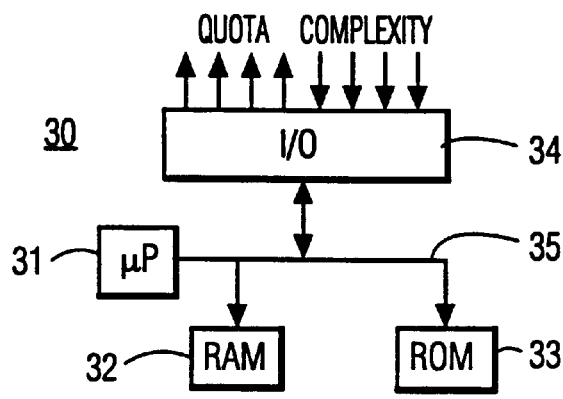
FIG. 4 is a block diagram of a bit rate allocator which may be used in the multiplexer system illustrated in FIG. 1.

In a preferred embodiment, bit rate allocator 30 (of FIG. 1), is a computer system having connections coupled to various circuit components in the plurality 10 of channel processors. FIG. 4 is a block diagram of the hardware forming the bit rate allocator 30. In FIG. 4, a microprocessor ($\mu$P) 31 is coupled to a read/write memory (RAM) 32, a read-only memory (ROM) 33 and an input/output (I/O) controller 34 over a computer system bus 35.

There are other components of the computer system, such as mass storage devices, and user terminals, which have not been illustrated in order to simplify the figure. The I/O controller 34 has a plurality of input terminals (COMPLEXITY) coupled to corresponding complexity output terminals of the plurality 10 of channel processors (of FIG. 1) and a plurality of output terminals (QUOTA) coupled to corresponding quota input terminals of the plurality 10 of channel processors.

The microprocessor 31, RAM 32, ROM 33 and I/O controller 34 operate as a computer system in known manner to execute programs stored in the ROM 33, store and retrieve data in the RAM 32 and receive data from and transmit data to the devices attached to the I/O controller 34. The data representing the current coding complexity of the video signals being encoded in the plurality 10 of channel processors (of FIG. 1) are received from the corresponding output terminals of those channel processors at the I/O controller 34 via the COMPLEXITY input terminals. The microprocessor 31 retrieves those signals from the I/O controller 34 via the computer system bus 35, determines the quota of bits for the next GOP for each of the encoders, and supplies signals representing those quotas to the corresponding ones of the plurality 10 of channel processors via the QUOTA output terminals.

Figure 5:
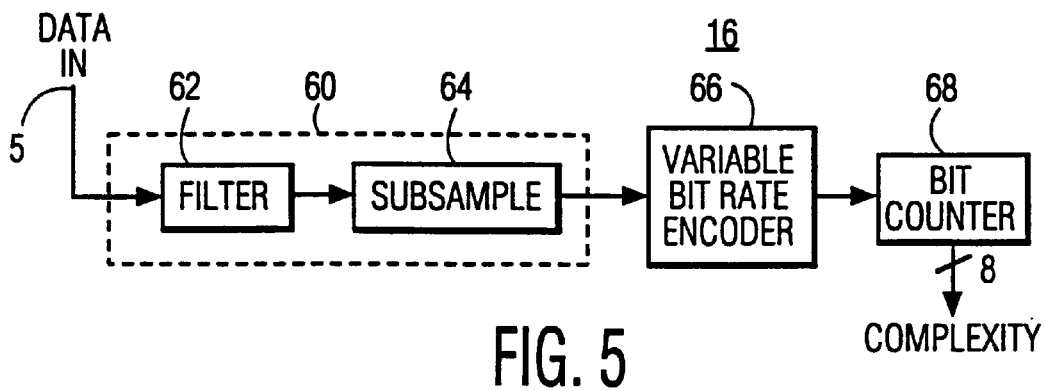
FIG. 5 is a more detailed block diagram of a complexity analyzer which may be used in the channel processor illustrated in FIG. 2.

A preferred method for determining the coding complexity of a video signal being encoded by an MPEG encoder 14 (of FIG. 3) utilizes a VBR encoder operating on a video signal corresponding to the video signal being encoded, but at a reduced resolution. FIG. 5 is a block diagram of complexity analyzer 16 (of FIG. 2) which generates a coding complexity signal according to this method. Various clock and control signals have been omitted from FIG. 5, to simplify it, however, what signals are required, and the necessary timing and voltage characteristics of these signals are well understood.

In FIG. 5, a serial connection of a subsampling system 60, formed by an antialiasing filter 62 and a subsampler 64, a VBR encoder 66 and a bit counter 68 are coupled between a data input terminal 5 and a complexity output terminal (COMPLEXITY). The data input terminal 5 is coupled to a video signal source (not shown) the complexity output terminal is coupled to bit rate encoder 30 (of FIG. 1) and to the bit rate regulator 49 (of FIG. 3).

In operation, the video signal whose complexity is being analyzed is first processed by the subsampling subsystem 60. Antialiasing filter 62 filters the input video signal in known manner to minimize artifacts which might result from the subsampling operation. This filtered video signal is then subsampled in subsampler 64. The subsampling will reduce the spatial resolution of the signal. For example, if every other line is omitted, and every other pixel of the remaining lines is omitted, the resulting video signal is subsampled by one-half in both the vertical and horizontal dimensions. The resulting frame of spatially subsampled video has one-quarter of the number of pixels in the original video signal. It is also possible to omit every other frame. The resulting video signal is temporally subsampled by one-half. When combined with the previous spatial subsampling, the resulting subsampled signal has one-eighth of the number of pixels in the original video signal. However, any subsampling factor may be applied in any of the dimensions.

In a preferred embodiment, the original (higher resolution) video signal is encoded at a spatial resolution specified in the international CCIR 601 standard document: 720 pixels by 480 lines. This video signal is appropriately filtered and subsampled into a lower resolution signal in what is termed the small image format (SIF), having 352 pixels by 240 lines. A GOP of the SIF video signal is then encoded by the VBR encoder 66. The number of bits in the encoded GOP is accumulated in bit counter 68. The accumulated number of bits in the GOP, as encoded by the VBR encoder 66, is the coding complexity for a GOP (designated $X_{GOP}$). This complexity measure is supplied to the CBR encoder 14 encoding this video signal.

The number of frames or pictures in a GOP, designated N, is generally constant. However, N can change. It is also possible that different channels operate at different frame or picture rates. For example, channels carrying standard video (in the U.S.) operate at 30 frames per second, channels carrying film images operate at 24 frames per second, and channels carrying cartoons operate at 15 frames per second. It is further possible that different channels have different numbers of pictures or frames in a GOP. Thus, it is possible that different channels have different GOP time periods. In order to accurately allocate bits to channels under such conditions, the GOP coding complexity values for the plurality of channels in such situations are time normalized in the bit rate allocator 30 by dividing the GOP complexity value from the complexity analyzer 16 for each channel by that channel's GOP time period (designated $GOP_{time}$). (See equation (1)). The normalized GOP coding complexity value (designated $Xnorm_{GOP}$) is then used to allocate bits among the different channels.

$$Xnorm_{GOP} = \frac{X_{GOP}}{GOP_{time}} \qquad (1)$$

In order to simplify the transmission, the coding complexity value $X_{GOP}$ may be scaled. In a preferred embodiment, this value is scaled into an eight bit number. This scaled value is passed to the bit rate allocator 30 (of FIG. 4), which will then calculate the allocation of bits for each of the plurality 10 of channel processors. It may also be desirable for the computer system to maintain a file of the GOP complexity values $X_{GOP}$, for example in a mass storage device (not shown).

In the discussion below, $X^i$ will represent the appropriate one of either $X_{GOP}$ or $Xnorm_{GOP}$ from the $i^{th}$ channel processor. The bit rate allocator 30 (of FIG. 1) generates respective QUOTA signals representing allocations of the available bits in the transmission link based on the coding complexity values $X^i$ from all of the K channel processors forming the plurality of channel processors 10. The predetermined transmission link bit rate from the output terminal of the multiplexer 20 (of FIG. 1) (designated R) is allocated among the plurality 10 of channel processors, so that the $i^{th}$ channel processor receives a bit rate allocation designated $R^i$.

One method for allocating bit rates in the transmission link to the different channels is a linear allocation based on the coding complexity $X^i$ of the GOP for all of the plurality 10 of channel processors (of FIG. 1). In this method, each processor i receives the same proportion $R^i$ of the total bit capacity R as the coding complexity of that encoder $X^i$ bears to the total coding complexity of all the encoders. (See equation (2)). However, it has been found that there is a lower bit rate allocation below which the quality of a reproduced image drops precipitously.

$$R^i = \frac{X^i}{\sum_{j=1}^{K} X^j} R \qquad (2)$$

An alternative method for allocating bit rates in the transmission link to different channels guarantees a minimum bit rate allocation $RG^i$ to each encoder i, and allocates the remaining bits linearly, as in equation (2). (See equation (3)). Each channel may have a different guaranteed minimum bit rate depending upon the anticipated overall complexity of the video transmitted through the channel and/or pricing of the channel to the providers of the video signals.

$$R^i = RG^i + \frac{X^i}{\sum_{j=1}^{K} X^j}\left[R - \sum_{j=1}^{K} RG^j\right] \qquad (3)$$

Yet another alternative method for allocating bits in the transmission link to different channels provides a weighting factor $P^i$ for each encoder i and allocates bits proportionately according to the coding complexity values $X^i$, as weighted by the weighting factors $P^i$. (See equation (4)). As in the guaranteed minimum allocation method of equation (3), the weighting factors $P^i$ may depend on anticipated overall complexity of the video signal transmitted through the channel and/or pricing of the channel to the provider of the video signals.

$$R^i = \frac{P^i X^i}{\sum_{j=1}^{K} P^j X^j}(R) \qquad (4)$$

A preferred method for allocating bits in the transmission link to different channels is a combination of the weighted allocation method of equation (4) and the guaranteed minimum allocation method of equation (3). In this method each channel is guaranteed a minimum allocation, and the remaining bits are allocated on a weighted basis. (See equation (5)). As above, both $$R^i = RG^i + \frac{P^i X^i}{\sum_{j=1}^{K} P^j X^j}\left[R - \sum_{j=1}^{K} RG^j\right] \qquad (5)$$

the guaranteed minimum allocation and the weighting factors may depend upon the anticipated overall complexity of the video signal transmitted over the channel and/or pricing of the channel to the provider of the video signals.

It is possible to further refine the bit allocations $R^i$, in response to other parameters of the system. For example, it has been found that there is an upper bit rate allocation value above which no improvement in the quality of the reproduced image is visible. Thus, an allocation of bits in excess of this upper allocation value is wasteful of bits in the transmission link. Also, the operator of the transmission link may impose a maximum bit rate allocation $R_{max}$ (which can reflect the above upper bit rate allocation value) and/or a minimum bit rate allocation $R_{min}$ for each channel. In addition, due to constraints on the size of the output buffers 18 (of FIG. 2) in each encoder, there may be imposed a maximum increment of increase $\alpha$ and/or decrease $\beta$ in the bit rate allocation from one GOP to the next for a channel in order to minimize the possibility of buffer overflow or underflow, respectively, caused by a change in the bit rate allocation for that channel. As above, the values of the upper bit rate allocation value, the maximum and minimum bit rate allocations, and maximum increments of increase and decrease, may be different for the different channels, and may depend on the anticipated overall complexity of the video signal to be transmitted through this channel and/or the pricing of the channel to the provider of the video signals.

If such limits are imposed in a multiplexer system, then after bit rate allocations have been calculated according to equations (2), (3), (4) or (5), those bit rate allocations are checked to determine whether they fall within the current upper and lower limits for that channel. First, the upper and lower limits for each channel i are determined. The upper limit bit rate allocation for any quota period k (designated $R^i_{upper}[k]$) is the minimum of: the maximum permissible increased allocation over the previous quota period k−1; and the maximum bit rate allocation limit. (See equation (6)). The lower limit bit allocation for any quota period $$R^i_{upper}[k] = min\{R^i_{max}, (1+\alpha)R^i[k-1]\} \quad (6)$$

k, $R^i_{lower}[k]$ is the maximum of: the minimum permissible decreased allocation over the previous quota period k−1; and the minimum bit rate allocation limit. (See equation (7)). Then adjustments in the bit rate allocations for the channels are made.

$$R^i_{lower}[k] = max\{R^i_{min}, (1-\beta)R^i[k-1]\} \quad (7)$$

If the allocated bit rate for any channel exceeds either limiting value, the bit rate allocation for that channel is set to that limiting value, and the available remaining bit rate is reallocated among the other channels. For example, if the bit rate allocated to a channel i, as calculated in equation (2), (3), (4) or (5), is greater than the upper limit for that channel, as calculated in equation (6), then the bit rate for channel i is set to that upper limit $R^i_{upper}$. If, conversely, the bit rate is less than the lower limit calculated in equation (7), then the bit rate is set to that lower limit $R^i_{lower}$. (See equation (8)).

$$R^i[k] = \begin{cases} R^i_{lower}[k] & \text{if } R^i[k] < R^i_{lower}[k] \\ R^i_{upper}[k] & \text{if } R^i[k] > R^i_{upper}[k] \\ R^i[k] & \text{otherwise} \end{cases} \quad (8)$$

If any of the bit rate allocations are changed by the limiting operations of equations (6), (7) and (8), then the remaining available bit rate is reallocated among the non-limited channels in accordance with equation (2), (3), (4) or (5). Then these channels are again checked against the limits in equations (6), (7) and (8). This cycle is repeated until all bit rate allocations are finalized. In the preferred embodiment, the quota cycle is the GOP period, which is of sufficient duration that changes in bit rate allocations in a channel from one period to the next should generally be relatively small. Consequently, equations (6), (7) and (8) should only rarely be invoked.

The above multiplexer system has been described as a collocated system. However, the plurality 10 of channel processors could reside in remote locations from the bit rate allocator 30 and the multiplexer 20. In such a system, communication links would be established between the encoders and the bit rate allocator. In this case, some portion of the bits transmitted between the processors 10 and the multiplexer could be dedicated to transmission of complexity information from the processors.

What is claimed is:

1. Complexity determining apparatus, comprising:
    a source of a data signal representing a picture frame;
    a subsampler system, coupled to said data signal source, for producing a subsampled signal representing said picture data signal;
    a variable bit rate (VBR) encoder, responsive to said subsampled signal, for producing an encoded signal representing said subsampled picture signal; and
    a counter for accumulating the number of bits in said encoded signal and producing a complexity representative signal corresponding to the accumulated number of bits, whereby said complexity signal represents the complexity of said picture frame.

2. The complexity determining apparatus of claim 1, wherein the subsampler subsystem comprises:
    an antialiasing filter coupled to said data signal source; and
    a subsampler, coupled to said antialiasing filter.

3. The complexity determining apparatus of claim 1, wherein:
    said subsampler produces said subsampled signal corresponding to said picture signal and spatially subsampled.

4. The complexity determining apparatus of claim 3, wherein said subsampler produces said subsampled signal corresponding to said picture signal and temporally subsampled.

5. The complexity determining apparatus of claim 1, wherein:
    said subsampler produces said subsampled signal corresponding to said picture signal and temporally subsampled.

6. The complexity determining apparatus of claim 1, wherein:
    said data signal source produces said picture signal having CCIR 601 resolution comprising a sequence of frames, each frame representing a picture including 480 lines, each line including 720 pixels; and
    said subsampling system produces said subsampled signal having Small Image Format (SIF) resolution comprising a sequence of frames, each frame including 240 lines, each line including 352 pixels.

7. The complexity determining apparatus of claim 1, wherein said complexity representative signal is a scaled representation of said number of bits.

8. The complexity determining apparatus of claim 7, wherein said scaled representation is said number of bits, scaled into an eight bit signal.

9. A constant bit rate (CBR) encoder, for producing an encoded signal, representing a picture data signal, at a predetermined constant bit rate, comprising:

a source of said data signal representing a picture frame;

a subsampler system, coupled to said data signal source, for producing a subsampled signal representing said picture data signal;

a variable bit rate (VBR) encoder, responsive to said subsampled signal, for producing an encoded signal representing said subsampled picture signal;

a counter for accumulating the number of bits in said encoded signal and producing a complexity representative signal corresponding to the accumulated number of bits for said picture signal;

a variable quantizer, coupled to said data signal source and responsive to a control signal, for producing a quantized signal representing said picture data signal having a quantizing step size varied in response to said control signal;

an encoder, responsive to said quantized signal, for producing said encoded signal; and a bit rate regulator, responsive to said picture complexity representative signal, for generating said control signal such that the quantizing step size in said variable quantizer is varied so as to maintain the bit rate of said encoded signal at said predetermined constant bit rate for said picture data.

10. The CBR encoder of claim 9, further comprising a delay element, coupled between said data signal source and said variable quantizer, to delay said data signal for a time period such that said control signal is received at the variable quantizer simultaneously with the data signal in response to which said control signal was produced.

11. A multiplexing system, comprising:

a plurality of sources of data signals;

a multiplexer having a plurality of input terminals, and an output terminal;

a plurality of channel processors, each having a data input terminal coupled to a respective one of the data signal sources, a complexity output terminal producing a signal representative of the complexity of the data signal at the data input terminal, a control input terminal, and a data output terminal coupled to a respective one of the input terminals of the multiplexer and producing an encoded signal at a constant bit rate set in response to the signal at the control input terminal, each of the plurality of channel processors comprising:

a constant bit rate encoder having a data path coupled between the data input terminal and the data output terminal of the channel processor, and a quota input terminal coupled to the control input terminal of the channel processor, for generating the encoded signal;

a subsampler system, coupled to said data signal source, for producing a subsampled signal representing said data signal;

a variable bit rate (VBR) encoder, responsive to said subsampled signal, for producing an encoded signal representing said subsampled signal; and a counter for accumulating the number of bits in said encoded signal and producing a complexity representative signal corresponding to the accumulated number of bits; and a bit rate allocator, having a plurality of pairs of associated input and output terminals, each pair associated with a respective one of the channel processors, the input terminal of each pair coupled to the complexity output terminal of the associated channel processor, and the output terminal of each pair coupled to the control input terminal of the associated channel processor and generating a bit rate quota signal such that the bit rate of the signal at the data output terminal of the associated channel processor is related to the complexity represented by the signal at the associated input terminal and the combined complexity represented by the signals at the input terminals of all of the plurality of pairs.

12. The multiplexing system of claim 11, wherein said channel processor further comprises a delay element, coupled between the data input terminal of the channel processor and the data path of the constant bit rate encoder, to delay the data signal at the data input terminal for a time period such that the bit rate quota signal is received from the bit rate allocator at the control input terminal of the channel processor simultaneously with the data signal in response to which said bit rate quota signal was produced.

13. Complexity determining apparatus, comprising:

a source of a data signal representing an MPEG Group of Pictures (GOP);

a subsampler system, coupled to said data signal source, for producing a subsampled signal representing said picture data signal;

a variable bit rate (VBR) encoder, responsive to said subsampled signal, for producing an encoded signal representing said subsampled picture signal; and a counter for accumulating the number of bits in said encoded signal and producing a complexity representative signal corresponding to the accumulated number of bits, whereby said complexity signal represents the complexity of said Group of Pictures.

14. In a video signal processing system including a video signal encoder in a main signal path having an input for receiving a video signal, complexity determining apparatus coupled to said main signal path comprising:

a subsampler coupled to said main signal path prior to said encoder, for producing a subsampled signal representing said video signal;

a variable bit rate (VBR) encoder responsive to said subsampled signal for producing a VBR encoded subsampled signal, whereby said VBR encoder responds to a video signal corresponding to the video signal being encoded by said video encoder in said main signal path but at a reduced resolution; and a counter for accumulating the number of bits in said VBR encoded signal and producing a complexity representative signal corresponding to the accumulated number of bits, whereby said complexity signal represents the complexity of said video signal.

15. Apparatus according to claim 14, wherein said video signal encoder is a constant bit rate encoder.

* * * * *